United States Patent
Reynolds et al.

(10) Patent No.: US 7,024,120 B2
(45) Date of Patent: Apr. 4, 2006

(54) PHASE TRACKING MULTICHANNEL LINK

(75) Inventors: Timothy N. Reynolds, Lanham, MD (US); Edward M. Alexander, Falls Church, VA (US); Anthony E. Spezio, Laurel, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 705 days.

(21) Appl. No.: 10/113,653

(22) Filed: Mar. 29, 2002

(65) Prior Publication Data

US 2004/0208636 A1 Oct. 21, 2004

(51) Int. Cl.
*H04B 10/00* (2006.01)

(52) U.S. Cl. .......................... 398/116; 398/91; 398/115
(58) Field of Classification Search ................ 398/91, 398/115–117, 118, 131, 129
See application file for complete search history.

(56) References Cited

U.S. PATENT DOCUMENTS

| | | | | |
|---|---|---|---|---|
| 4,864,310 A | * | 9/1989 | Bernard et al. ............. | 342/368 |
| 6,046,697 A | * | 4/2000 | Overbury et al. ........... | 342/360 |
| 6,163,296 A | * | 12/2000 | Lier et al. .................... | 342/417 |
| 6,337,628 B1 | * | 1/2002 | Campana, Jr. ........... | 340/573.4 |

* cited by examiner

*Primary Examiner*—Leslie Pascal
(74) *Attorney, Agent, or Firm*—John J. Karasek; L. George Legg (57) ABSTRACT

A phase tracking multichannel apparatus includes a plurality of optical transmitters, an optical multiplexer, a common optical link, and a user electronics. RF signals having different phases are received and are output on separate RF channels, each of which is coupled to an optical transmitter. RF-modulated optical output signals are then output to the optical multiplexer to produce a multiplexed output signal. The multiplexed signal is applied to a common optical link that at its output substantially maintains the phase separation of RF modulation components on optical carriers as received at its input. The optical output of the common optical link is then applied to an optical signal receiving system, such as an optical demultiplexer and a plurality of photodetectors. By multiplexing all of the optical signals onto the common optical fiber, all signals transmit the same path and, therefore, have the same time and phase delay. The phase tracking is preserved because all of the signals experience the same optical or expansive properties of the common optical fiber. A typical use would be to transmit multiple RF signals from an antenna array to a remote RF phase measuring receiver, such as a RF direction finding system.

15 Claims, 7 Drawing Sheets

PHASE TRACKING MULTICHANNEL LINK

TECHNICAL FIELD

This invention generally pertains to an optical link that preserves the relative phases of multiple radio frequency input signals and more specifically to an optical link that achieves this by preserving the relative phases between signals modulated on optical carriers, across time and over distance, regardless of changes in temperature and other environmental parameters. The invention applies to radio frequencies, up to and including millimeter waves, that can be modulated on optical carriers.

BACKGROUND ART

A phase tracking multichannel link (PMTL) is a link for preserving the relative phases of multiple input signals. A PTML accepts multichannel input signals and outputs signals that replicate the input signals except for the introduction of a signal time delay for delay line applications or a signal space displacement for link applications, with mutual input phases otherwise being preserved. A PTML is therefore intended to preserve the existing phase relationship between the input signals, across time (μsec) or over distance (km), regardless of changes in temperature or other environmental parameters.

As an example of its utility, the input signals to the PTML may be provided from a phased array antenna that samples the phases from a received radio frequency plane wave. An appropriate coherent receiver determines the wavefront direction from this collection of relative phases. Until now, this receiver has had to be located near the antenna to minimize the phase tracking errors generated by the connection between the antenna and receiver. This co-location was necessary because remote transmission between the antenna and receivers incurred unacceptable phase tracking errors. Currently, the connection method would be to use parallel coaxial RF cables or optical fiber cables with a different cable connecting each antenna element and the corresponding receiver channel. Phase tracking errors would occur in this link when the coaxial cables' physical properties are not precisely matched and are subjected to a change in temperature or other physical environments. Similarly, separate parallel fibers may not be precisely matched and therefore have different refractive or expansive indices, causing a change in phase with temperature or other physical environment. When the environmental changes differ for each fiber or cable, the propagation path length and consequent phase will change differentially by the refractive properties or by the expansion properties of even precisely matched cables or fibers. Each cable would require matched properties and matched lengths, and containment within a homogeneous environment over lengths of hundreds of meters to achieve phase tracking. Phase matching separate transmission lines over this distance is therefore extremely difficult in practice.

A practical example illustrates the magnitude of the difficulty of phase tracking. If two broadband (3 to 5-Gigahertz) signals were to be transmitted over separate 612-meter fiber links, a 3-microsecond delay in optical fiber, and if 5 degrees of phase tracking were to be maintained, the time delay over the optical link would be required to match to within 2.8 picoseconds, corresponding to 0.5 millimeter. If multiple lengths of identical fiber were matched this precisely, to 1 part-per-million (ppm), a subsequent non-uniform variation in the environment or non-uniform material response to the environment could readily eliminate the match. Even a 1-degree Celsius non-uniformity between fibers would cause an unacceptable 7-ppm (35 degree) mismatch, for example.

Therefore, the common approach is to place the receiver directly behind the antenna in an attempt to avoid these problems by minimizing the link length. This is the reason for co-locating a shipborne phased array antenna with the associated receiver. PTML allows a more desirable configuration with only the antenna mounted on a mast and the receiver located below the decks. This would reduce size and weight problems on the mast, eliminate environmental problems for the receiver, and eliminate the design constraints on the receiver caused by locating it on the mast.

PTML is also required in other applications. One such application is extracting multichannel signals from a hostile environment where interchannel phase must be preserved. Such hostile environments as temperature, moisture, or electromagnetic interference (EMI), for example, would not damage the antenna, which is passive, but would damage a receiver with sensitive electronic components. Another example for an application is a delay line for phase coherent signals.

DISCLOSURE OF THE INVENTION

The object of this invention is to provide a device that preserves the relative phases of multiple input signals at frequencies up to and including those of millimeter waves.

Another object of this invention is to provide a device that accepts multichannel signals, and outputs replicated signals, delayed in time for delay line applications or displaced in space for link applications, with their relative input phases preserved.

Another object of the invention is to provide a device that preserves the relative input phases between the signals, across time (μsec) or over distance (km), regardless of changes in temperature or other environmental parameters.

These and other objectives of the invention are achieved by a phase tracking multichannel apparatus that includes a plurality of optical transmitters, an optical multiplexer, a common optical link, and a user electronics that may include an optical demultiplexer and a plurality of photodetectors. RF signals having different phases are received and are output on separate RF channels, each of which is coupled to an optical transmitter. An RF-modulated optical output signal from each transmitter is output to the optical multiplexer. The optical multiplexer produces a multiplexed output signal of optical carriers having multiple RF modulation components with substantially the same phase separation as between that corresponding to RF signals at the optical transmitter inputs. The multiplexed signal is applied to a common optical link that at its output substantially maintains the phase separation of RF modulation components on optical carriers as received at its input. The optical output of the common optical link is applied to an optical signal receiving system, for example, an optical demultiplexer and a plurality of photodetectors.

By multiplexing all of the optical signals onto the common optical fiber, all signals transmit the same path and, therefore, have the same time and phase delay. The phase tracking is preserved because all of the signals experience the same optical or expansive properties of the common optical fiber. A typical use would be to transmit multiple RF signals from an antenna array to a remote RF phase measuring receiver, such as a RF direction finding system.

While several other optical multiplexing and demultiplexing systems and methods could be used, e.g. time-division multiplexing (TDM) or multiplexing by optical polarization, the optical signals can be easily multiplexed on to the optical fiber, and demultiplexed at the output of the link optical fiber using wave division multiplexing (WDM) techniques. To enable optical demultiplexing using the preferred WDM technology, each link channel uses a different optical carrier of monochromatic light.

Additional features and advantages of the present invention will be set forth in, or be apparent from, the detailed description of preferred embodiments that follows.

BEST MODE FOR CARRYING OUT THE INVENTION

Definition of Term(s): The term "common" as used herein, when referring to a "common optical link" or the like, includes a single optical fiber as well as other optical links by which a plurality of signals or a multiplexed signal having a plurality of phases capable of being demultiplexed into a plurality of signals retaining relative phase differences are transmitted along a common optical or signal path.

Figure 1:
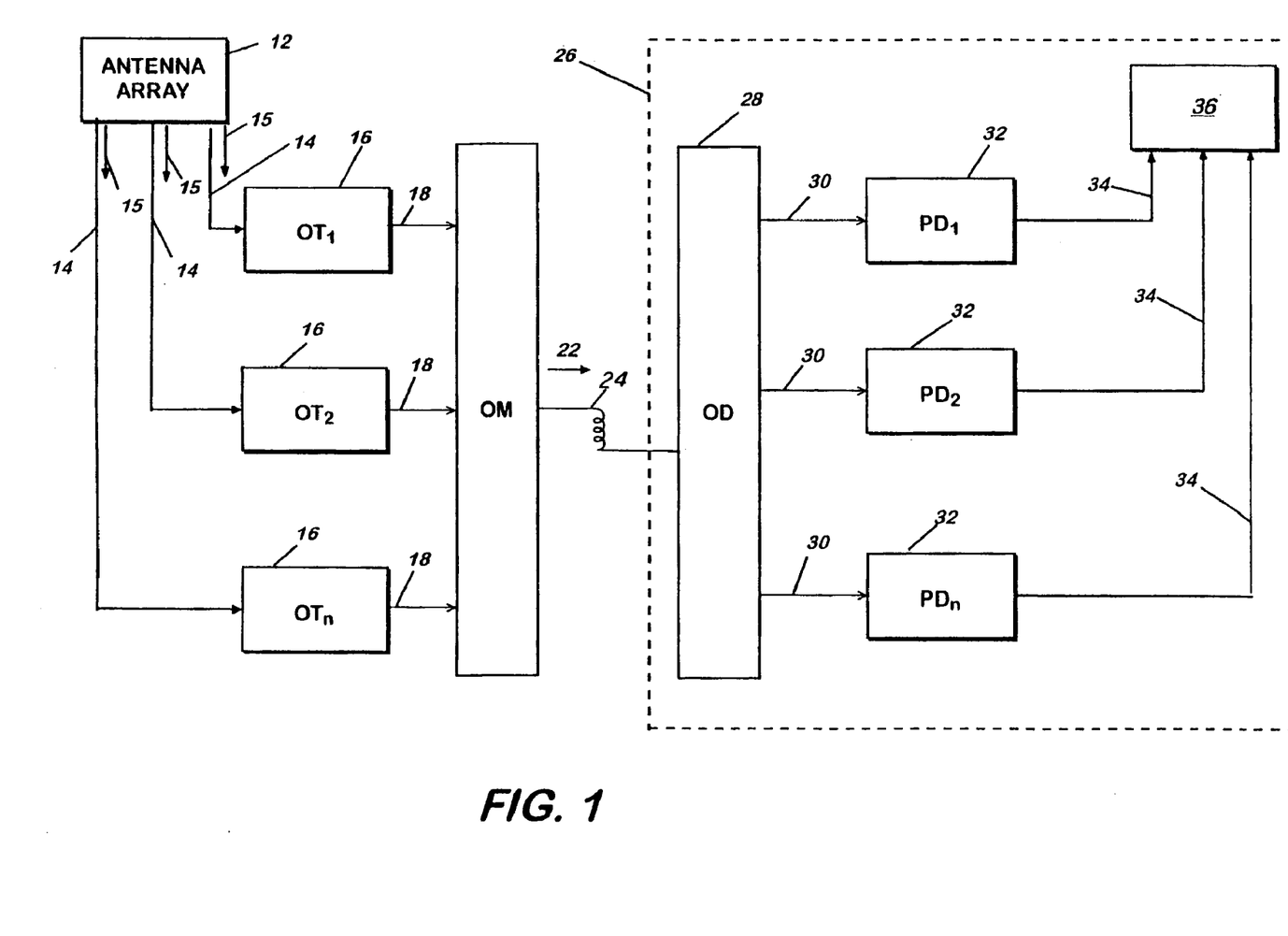
FIG. 1 shows a block diagram of an embodiment of a direct-modulated phase tracking multichannel link (PMTL) according to the invention.

As shown in FIG. 1, a phase tracking multichannel link (PTML) 10 has a plurality 1, 2, . . . . . . n of input channels 14 for carrying a plurality of respective received radio frequency (RF) signals 15, e.g. via a standard RF coaxial cable preferably having about 50 ohms impedance. An example of such signals would be from an antenna array 12. The antenna could comprise a phased array antenna configured for sampling the phases from a received radio frequency plane wave, whereby coherent RF input signals 15 have a relative input phase separation between adjacent signal bands or channels. Each input RF signal is preferably associated with a particular channel 14 assignment within PTML 10, and the number of channels 14 accordingly varies depending on the design complexity and desired performance of a particular PTML 10. Each channel 14 is assigned to carry a RF signal 15 having a phase corresponding to that channel. Channels 14 preferably utilize cables that are of the same type and of the same length so that the cables are phase matched.

Each signal 15 is input into a modulation port of an optical transmitter (OT) 16 that is associated with each channel 14. Preferably, OT 16 is a laser diode (LD) transmitter, such as a model 3741-C01-020 Fiberoptic Transmitter, manufactured by Ortel Corporation. OT 16 converts RF signal 15 into an RF modulated optical output signal 18. The modulation of the RF signal upon the optical carrier is preferably amplitude modulation (AM), in which the optical power of each OT 16 is modulated in amplitude in proportion to the RF signal 15. Preferably, direct modulation is used to produce the AM of signal 15. The direct modulation uses modulation internal to the light source, modulating the drive current of the laser diode, for example, to cause AM. An alternative method that is described in more detail further below in reference to FIGS. 2 and 3 allows the use of a laser diode as the optical source having a fixed output and using a separate external modulator. The external modulator modulates the amplitude of the light from the fixed output optical source using a Mach-Zehnder interferometer wherein the RF modulation signal is applied. The fixed output laser diode-external modulator combination provides in those configurations what OT 16 provides for that illustrated in FIG. 1.

Each modulated optical output signal 18 is input to an optical multiplexer (OM) 20, preferably a wavelength division multiplexer (WDM), and preferably via a fiber pigtail interconnection that may be either connectorized or fusion spliced. The number of channels 1, 2 . . . . n that may be multiplexed depends on the channel handling capacity of OM 20, which is selected accordingly. OTs 16 should have optical properties that match the optical filtering or other optical carrier discrimination technique that is used in OM 20 or in the optical demultiplexer (OD) 28 described below. In the case of the preferred WDM technology, OTs 16 should output monochromatic light, preferably laser light at a single longitudinal mode and a single transverse mode, preferably from laser diodes, at wavelengths that conform to the respective OM 20 wavelengths. In the preferable WDM devices, OM 20 has a discrete set of channel wavelengths corresponding to an identical set on a OD 28. OD 28 uses a set of optical passband filters that act as passband filters where only that wavelength for the passband channel passes through. For good channel signal isolation, the optical channel separation must be sufficient for good optical isolation, typically 30 dB. (This corresponds to 60-dB RF isolation.) Typically, that requires at least a 200 GHz separation capability in the center optical frequency of passband filters when using the preferable, presently available OM 20 technology. A frequency separation of 200 GHz corresponds to a wavelength separation of 1.6 nm in the 1550 nm wavelength range. Also, a technique of unequal frequency separation may be employed to reduce crosstalk. In this technique, in the example used to demonstrate this embodiment, the two wavelength separations between the 3 WDM channels were 1.6 and 2.4 nm, so that the mixing products that occur from nonlinear interaction in the link fiber are on wavelengths other than the OD 28 passband wavelengths.

OM 20 multiplexes the modulated optical signals 18 to generate a single multiplexed optical output signal 22 that is applied to and transmitted through a common fiber link 24 to an optical signal receiving system 26. Multiplexing signals 18 into a single output signal 22 allows optical signal receiving system 26 to be located remotely from the upstream components, i.e. antenna array 12-OM 20, while maintaining a desirable phase-tracking output signal capability. This is desirable in applications such as shipboard radar direction finding, in which with the antenna array positioned on the mast the downstream components can be placed below decks, improving the operator accessibility as well as the operating environment for this part of the system.

Fiber link 24 transfers signal 22 either in time (for delay line applications) or in space (for link applications). For delay lines, fiber link 24 could be coiled to conserve space. For transmission over long distances, fiber link 24 could be stretched out similar to a standard transmission line. A time delay line system would preferably be composed of a compact fiber coil 24 long enough to delay the signal sufficient for a fast tuning radio receiver, a gain adjusting system, or other RF signal processing system to prepare for reception of signals detected within the wide frequency band of the PTML. Typically this delay would be some microseconds, requiring several hundred meters of fiber. For delay lines using RF cables, such a length is impractical. A preferable fiber for fiber link 24 is single mode non-zero dispersion shifted optical fiber (NZ-DSF). This fiber should be single mode over the wavelengths of all the optical signals, so that each signal has one phase corresponding to a single mode for its wavelength in the fiber. The preferable dispersion-shifted fiber provides low dispersion in the 1.55-micron wavelength operating range of the preferably technology of Dense Wave Division Multiplexers (DWDMs). This low dispersion reduces the difference between propagation velocities of the wavelengths of the different channels, so that only small and correctable phase differences will occur between optical signals even over a long fiber link. The preferred non-zero dispersion shifted fiber is used to prevent the zero dispersion wavelength from occurring near a channel wavelength. If wavelength is varied to approach the zero dispersion wavelength, the nonlinear effect of four-wave mixing (FWM) rises rapidly to a maximum, and FWM couples optical power out of three channel wavelengths into nearby wavelengths. If the FWM wavelength occurs in another channel, signal cross-talk would occur. FWM is greatly reduced by using NZ-DSF. Using large effective area fiber (LEAF) further reduces FWM. Both of the preferred optical fibers are NZ-DSF types, one being Corning SMF-LS, the other Corning LEAF. To further reduce cross-talk, unequally spaced WDM 20 channels can be selected to put the FWM wavelengths outside all the channel passbands. When PTML 10 has a large number of transmission channels, the many resulting FWM wavelengths and limited number of channel wavelengths make this unequal channel wavelength technique infeasible. Instead, for many channels, the uniform channel separation can be increased, preferably to 300 GHz to provide greater channel isolation and, preferably, LEAF used to minimize FWM.

Optical fiber link 24 is preferably a single fiber. If the temperature changes, if there is a stress change in fiber link 24, a vibration or any other event affecting fiber link 24, all wavelengths being multiplexed through fiber link 24 are equally affected. All phase relationships are maintained because all signals traverse the same transmission path. Fiber link 24 should be low dispersion in the operating optical wavelengths of OTs 16, however, dispersion should not be so low as to cause FWM that increases cross talk above acceptable limits. The optical fibers used in the fiber link 24 and in the fiber pigtails carrying optical output signals 18 and those carrying the demultiplexed optical output signals 30 described below should be single mode, low loss optical fiber. Because the phase mismatch is cumulative, longer fiber link 24 lengths preferably should have a more nearly constant refractive index as a function of wavelength over the optical band of OM 20 and OD 28. The preferred low dispersion fiber is available that exhibits less than a 5-degree phase change over a 4-nm wavelength range over fiber link 24 lengths of less than 1 km.

As discussed above, system 26 includes OD 28 for receiving multiplexed optical signal 22 and for separating signal 22 into respective demultiplexed optical output signals 30 on the separated optical carriers, preferably having the same wavelengths as signals 18 applied to OM 20. In practice, for the preferably WDM technology, the wavelengths of the monochromatic light sources, preferably lasers, may vary somewhat, the acceptable variance depending on the nature of the application but typically being within a 0.1-nm tolerance of the ITU wavelength grid established for WDM technology. The passband of a WDM-d can be as narrow as 0.2 nm. Each signal 30 is applied to a photodetector (PD) 32, preferably a photodiodeamplifier, that converts signal 30 to an electrical RF signal 34 that is one of the outputs 34 of the PTML 10.

Typically, PTML 10 outputs 34 are input to a user electronics 36. The type of user electronics 36 of course depends on the intended application for PTML 10, an example of which is direction finding (DF), where user electronics 36 may include a coherent receiver for determining the direction of the received wavefront accurately due to the relative phases of RF input signals 15 being preserved in the form of signals 34 input to user electronics 36.

The OT 16 and PD 32 frequency responses require precise interchannel matching in both the optical and RF domains. The fibers connecting the channels to the link should have nearly identical optical properties. PDs 32, including any incorporated RF amplifiers, are phase matched between channels to assure tracking between signals in adjacent channels. The photodetector bandwidth should be sufficient to cover the wavelength range of the input signals in the optical domain and the frequency range in the RF domain. At a minimum, the photodetector optical bandwidth should cover the wavelength of the specific optical carrier of its corresponding channel. Phase tracking issues are essentially those of the cabling, amplifiers and the optical fiber pigtail connections. RF output signal 34 from PD 32 preferably is amplified to raise the signal level to that required for low noise detection, and interchannel signal matching. The type of user electronics 36 to which the output signal is to be applied also governs the desired signal strength of output signal 34 of PD 32.

All signal paths outside of optical fiber link 24 should be minimized in length and phase matched between channels to provide phase tracking. All electronics associated with PDs 32 and OTs 16 preferably have interchannel phase matching. PTML 10 may further include a configuration where common optical link 24 maintains the relative phase relationship as described above while the downstream electronics include permutations altering the relative output phases applied to the user electronics, i.e. so that these differ in some manner from the input phase relation. For example, a plurality of RF channels are transmitted over a link from a remoted phase-measuring antenna, and one or several of the optical carrier channels is extracted from the common link fiber 24, by use of a fiber Add/Drop Optical Module (ADOM) and sent to a wideband receiver, which detects signals of interest in the full system bandwidth and tunes several other, narrow band, phase-measuring receivers to detect the same signals some microseconds later (necessitated by processing time), achievable only by receiving the optical signals after all the channels have been delayed in a delay line by continuing in the common fiber.

If the fiber refractive indices vary with the environment, then index tracking between fibers is needed to assure transmission path length and phase tracking. Because the phase tracking errors increase with delay, to construct a longer fiber optic link 24 requires more precise phase matching.

The separate input fibers 18 may experience different environments. The same is true for the output fibers 30. To minimize the effect of varying environment on phase tracking errors, these lengths should be minimized and matched in length. Also, confining each set of fibers 18 and 30 to a compact, isolated enclosure, with the separation between fibers minimized, should help minimize the effect of environment.

WDM's are preferably utilized in device 10 to multiplex and demultiplex channels into a single phase tracking fiber transmission line 24. In conventional use, WDMs multiplex and demultiplex digital modulated optical signals typically, but always without regard to minor (i.e., sub-cycle in the RF carrier) signal phase relationships. In a conventional multi-channel communication use of WDMs, there would be no concern with phase relationships between optical channels at all. In a rare conventional use that requires digital signals on separate optical channels to be re-synchronized, the phase matching might be necessary to one transmitted digital bit, which would be at least several RF cycles, hundreds of times coarser than required in this device. Such use differs from that envisioned in PTML 10, where phase tracking is as a primary design characteristic and only possible after precise phase matching. Therefore, PTML 10 preserves the phases of multichannel signals without the impracticality of requiring multiple phase tracking transmission fibers over the entire link and without the impracticality of controlling the environment of each fiber over the transmission path. Also, this device preserves the phases of multichannel signals without the impracticality of fabricating multiple matched transmission cables over the entire link or the impracticality of controlling the environment of each cable over a long distance. The cable lengths within PTML 10 should preferably be the same within a fraction of a RF wavelength. The fiber pig tail connections should preferably be the same length to within a fraction of a RF wavelength. But the combined RF phase of the fiber pig tails and cables, both input and output, determines the actual phase match for each channel and should be phase matched between channels to within a fraction of a RF wavelength. For example, a representative phase matching spread is about 5 degrees, corresponding to about 0.5 millimeters of length matching in fiber and cable at a 5-gigahertz frequency. The optical fiber link 24 is preferably selected so that its characteristic dispersion does not result in poor interchannel phase match. Another solution to dispersion in very long lengths (on the order of many kilometers) of optical fiber link 24 is to splice two fibers of opposite characteristic dispersion together, so that the dispersion cancels over the whole length, this technique being known for use to reduce the different problem dispersion causes for optical communication.

Figure 2:
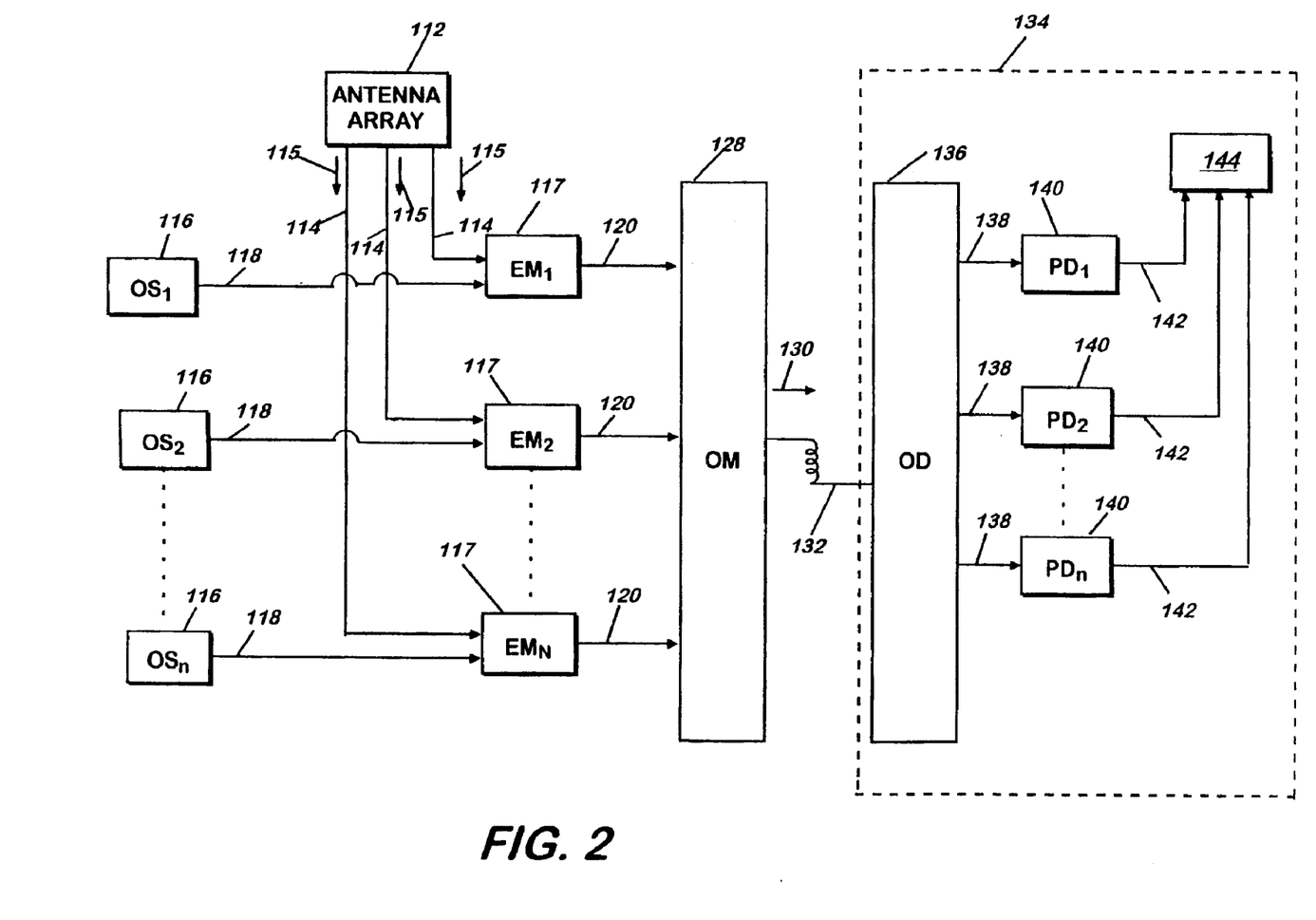
FIG. 2 shows a block diagram of an embodiment of an externally-modulated phase tracking multichannel link (PMTL) according to the invention.
Figure 3:
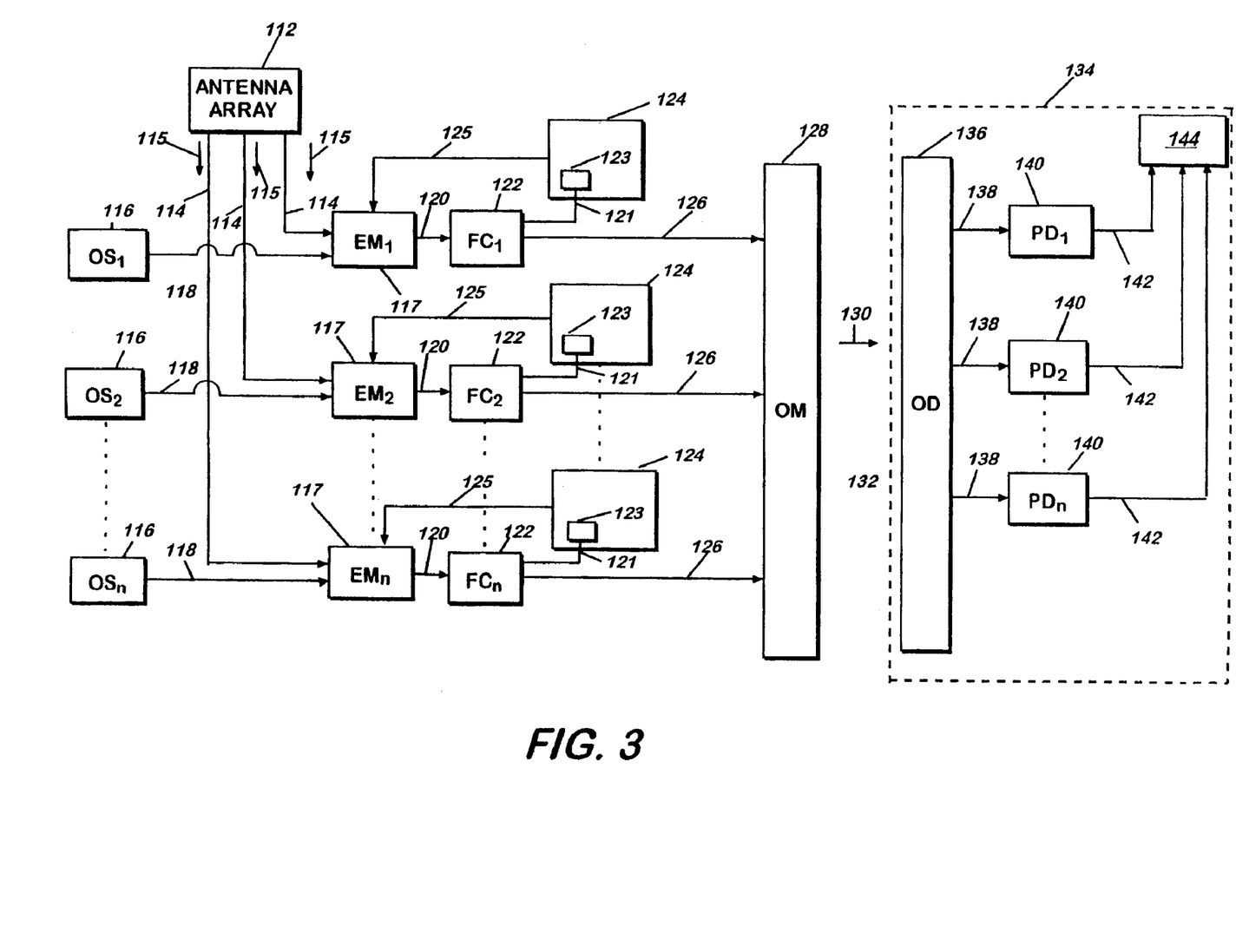
FIG. 3 shows a block diagram of an embodiment of a phase tracking multichannel link (PMTL) as in FIG. 2 and also including a bias control circuit according to the invention.

Referring now to FIGS. 2 and 3, in another embodiment of the invention, a PTML 100 would typically be used with an antenna array 112 having a plurality 1, 2 . . . . . n of output channels 114 for carrying a plurality of respective RF antenna output signals 115. PTML 100 inputs each RF input signal 115 to an external optical modulator (EM) 117, preferably a Mach-Zehnder (MZ) modulator. A fixed output optical source (OS) 116, preferably a laser diode (LD), is associated with each channel 114 and transmits its optical carrier output 118, preferably at the respective WDM wavelength to EM 117; external modulation is carried out by EM 117. A preferred example of a laser diode for OS 116 is the model FLD5F6CX-H manufactured by Fujitsu, available at many WDM wavelengths. EM 117 modulates the optical carrier from OS 116 preferably with AM using a Mach-Zehnder interferometer wherein the RF modulation signal is applied. Each OS 116 is connected to its respective EM 117, preferably with single mode fiber, and preferably using single mode polarization preserving fiber that is aligned in its polarization for the preferred MZ-type of modulator 117. An example of the preferred MZ modulator is model AM-150-1-3-C2-12 manufactured by JDS Uniphase. OS 116 preferably has constant optical power output and constant optical wavelength preferably maintained by its control circuit, by a Distributed Feed Back (DFB) laser diode optical structure and by an internal thermoelectric cooler (TEC) (not illustrated).

Each EM 117 thereby converts its input RF signal 115 into an initial RF-modulated optical signal output 120. FIG. 3 illustrates an optional bias control circuit for use with the externally modulated PTML 100. Optical signal 120 is input to a fiber coupler (FC) 122, preferably a single mode coupler. Fiber coupler 122 includes a first output 121 coupled to a monitor photodetector (MP) 123 that outputs an electrical signal to a bias control circuit 124. Bias control circuit 124 in response outputs a bias control signal 125 to EM 117, thereby forming a bias control feedback circuit for each EM 117. The preferable Mach-Zehnder interferometer EM 117 responds to its input voltage by an approximate linear change in phase in the interferometer. Optical interference responds, however, in a sinusoidal optical response to phase, and hence, to input voltage. For small voltage changes in the RF input, the resulting optical amplitude modulation is maximum only if the DC component of phase of the interferometer is held at a quadrature point. The quadrature point can drift with temperature, but also slowly with aging, so a DC bias is preferable to maintain long-term maximum output. But furthermore, the bias circuit can select either positive or negative slope quadrature, a choice of which is required for phase tracking.

Referring again to both FIGS. 2 and 3, an optical multiplexer (OM) 128, preferably a WDM-m, multiplexes the FC output signals 126 to generate a single multiplexed modulated optical output signal 130 that is applied via a common fiber link 132 to a signal receiving and processing system 134, with signal 130 undergoing either a time or space transfer, as has been previously described with respect to PTML 10. PTML 100 also includes an optical demultiplexer 136, preferably a WDM-d, for receiving multiplexed optical signal 132 and for separating signal 132 into a plurality of demultiplexed optical signals 138 corresponding to the upstream channel assignations and relative wavelengths and phases, each demultiplexed optical signal 138 then being applied to a photodetector (PD) 140, preferably a photodiode, and preferably incorporating a transimpedance amplifier. The PD 140 converts the modulation of the optical signal to a RF output signal 142 at a radio frequency input up to and including millimeter waves. Typically, PTML 100 transmits the RF output signals 142 as input to a user electronics 144 with the relative phases between the input signals 115 preserved as with PTML 10.

The primary advantages of the externally modulated PTML 100 illustrated in FIGS. 2 and 3 as compared with the PTML 10 illustrated in FIG. 1 are that recently-available commercial-off-the-shelf (COTS) lasers are preferably used, and the use of external modulators 117 improves dynamic range and signal bandwidth. It is also noted that phase matching is not required between OS 116 and EM 117, which therefore permits remoting the OS 116 from the EM 117, the EM typically near an antenna. Fiber 118 could be run long distances, allowing the OS 116 to be protected from extreme temperatures, temperature variations and electrical power transients. It is also noted that the above descriptions referring to the desired or preferred properties and characteristics of elements 24–36 of FIG. 1 also apply to each corresponding element 132–144 in FIGS. 2 and 3. Also in regard to the embodiments of the latter figures, these connections, and the number of channels that may be multiplexed, the selected wavelengths, and the optical channel separation, should be selected in accordance with the criteria and system performance characteristics as described above with respect to PTML 10.

Figure 4:
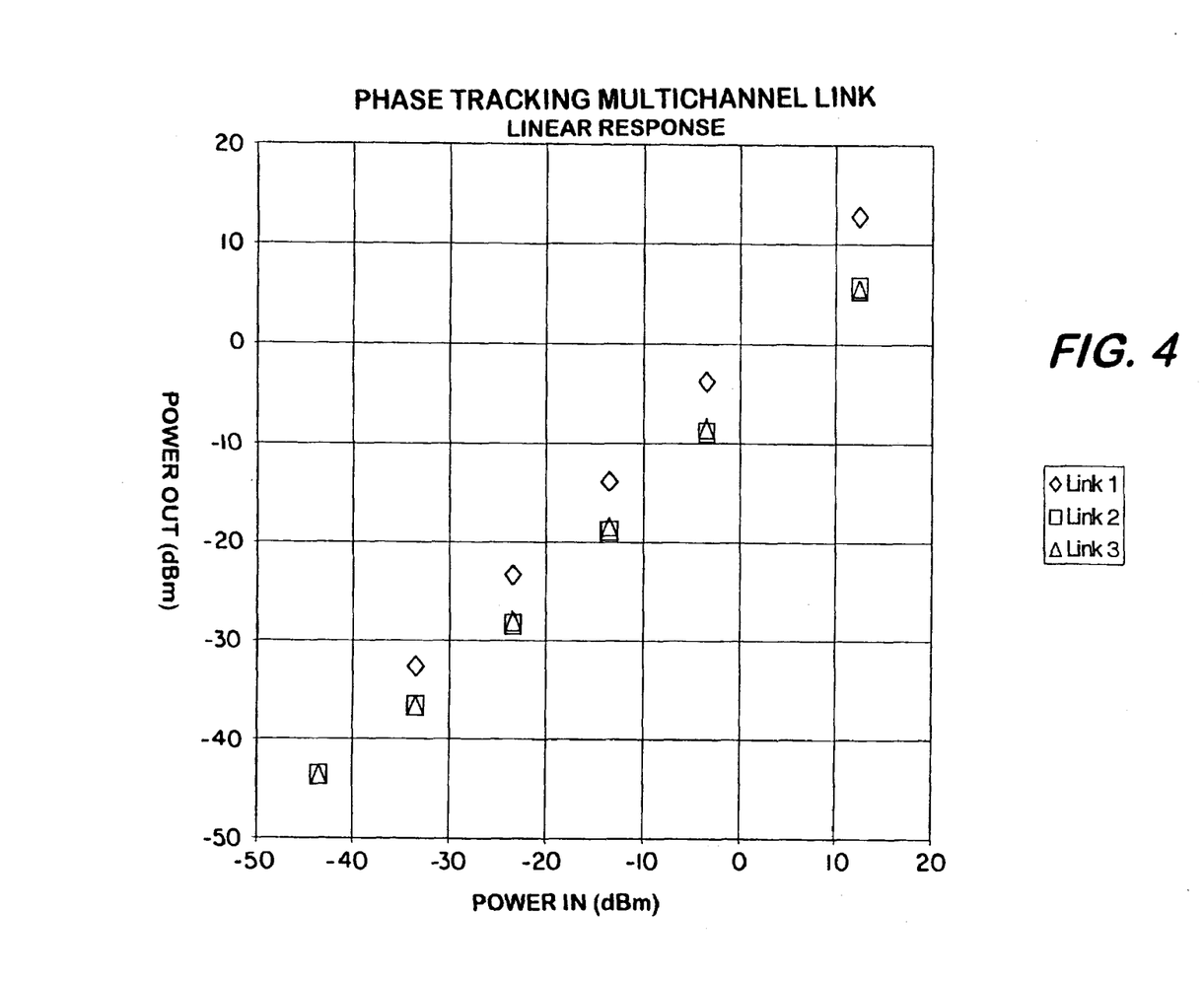
FIG. 4 shows a graph of the linear dynamic range performance of an embodiment of a phase tracking multichannel link (PTML) according to the invention.
Figure 5:
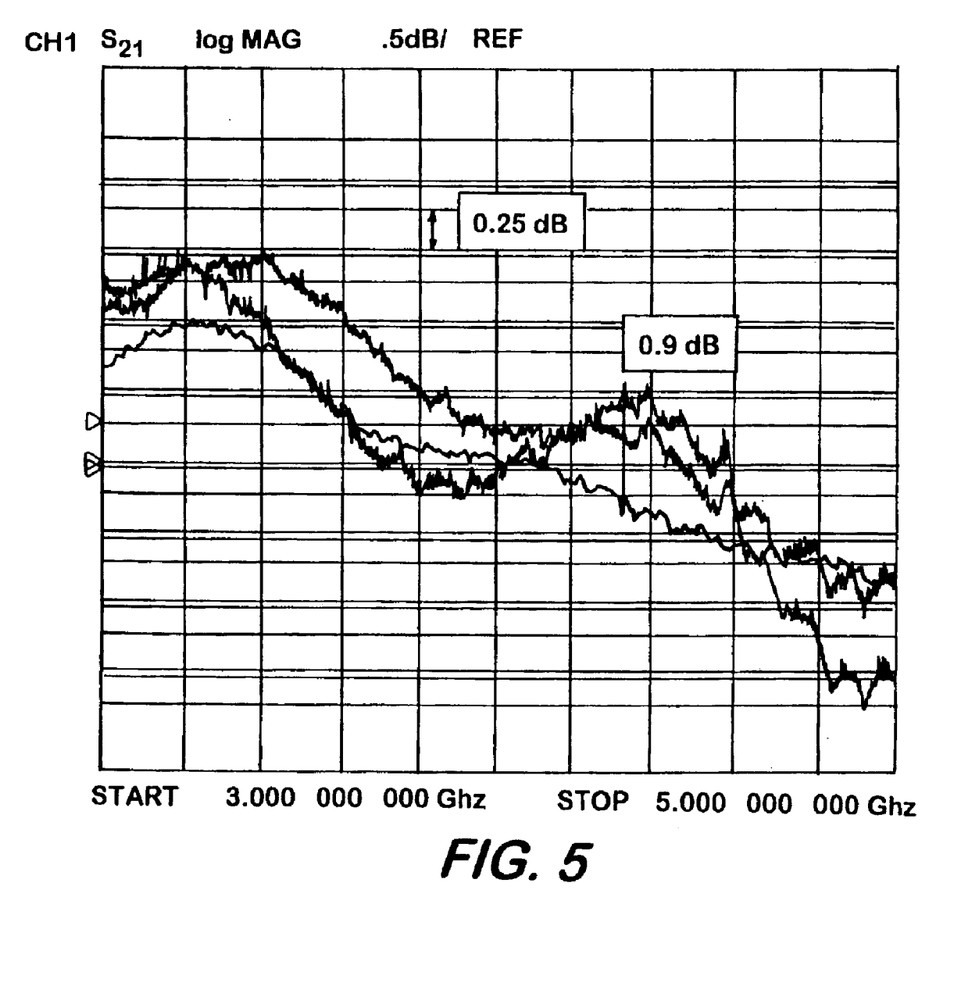
FIG. 5 shows a graph of the amplitude tracking performance of an embodiment of a phase tracking multichannel link (PMTL) according to the invention.
Figure 6:
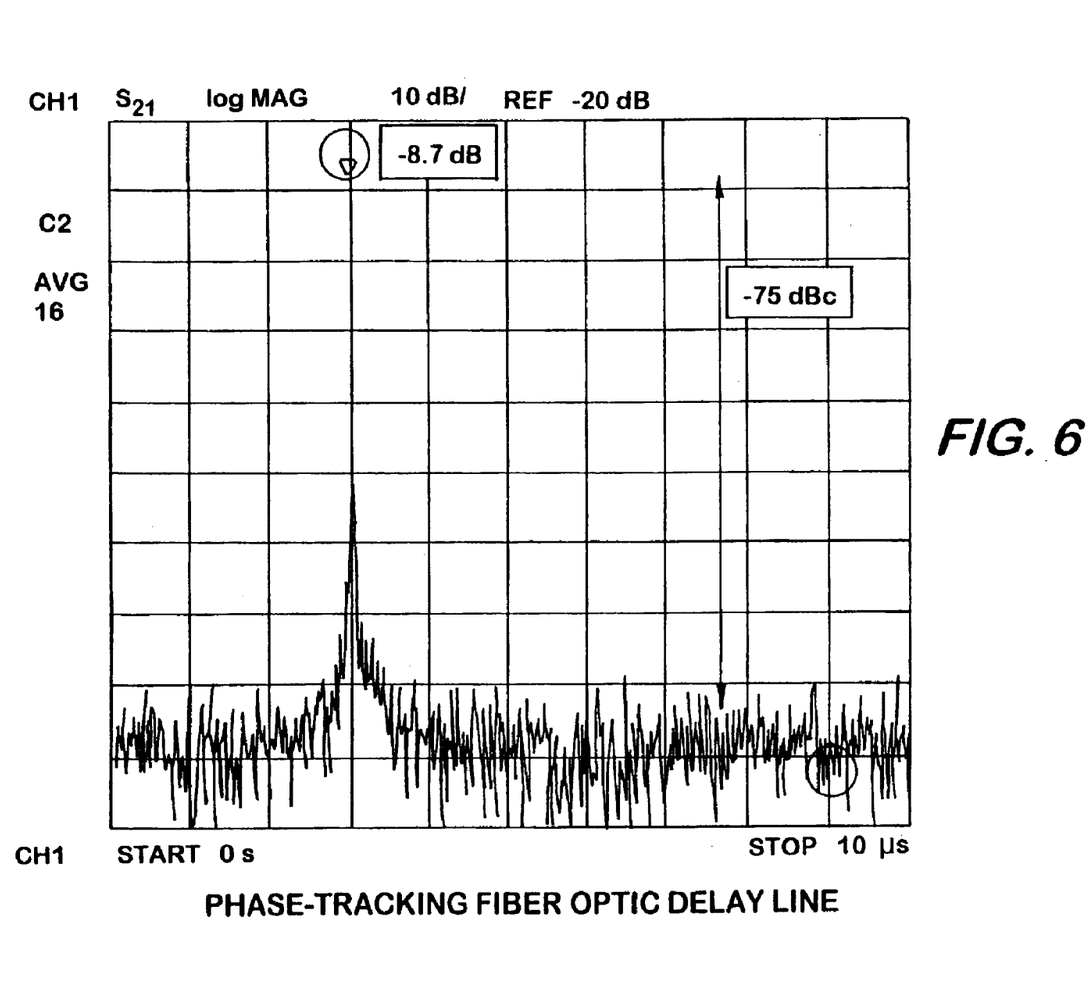
FIG. 6 shows a graph of the minimal reflected signal performance of an embodiment of a phase tracking multichannel link (PMTL) according to the invention.
Figure 7:
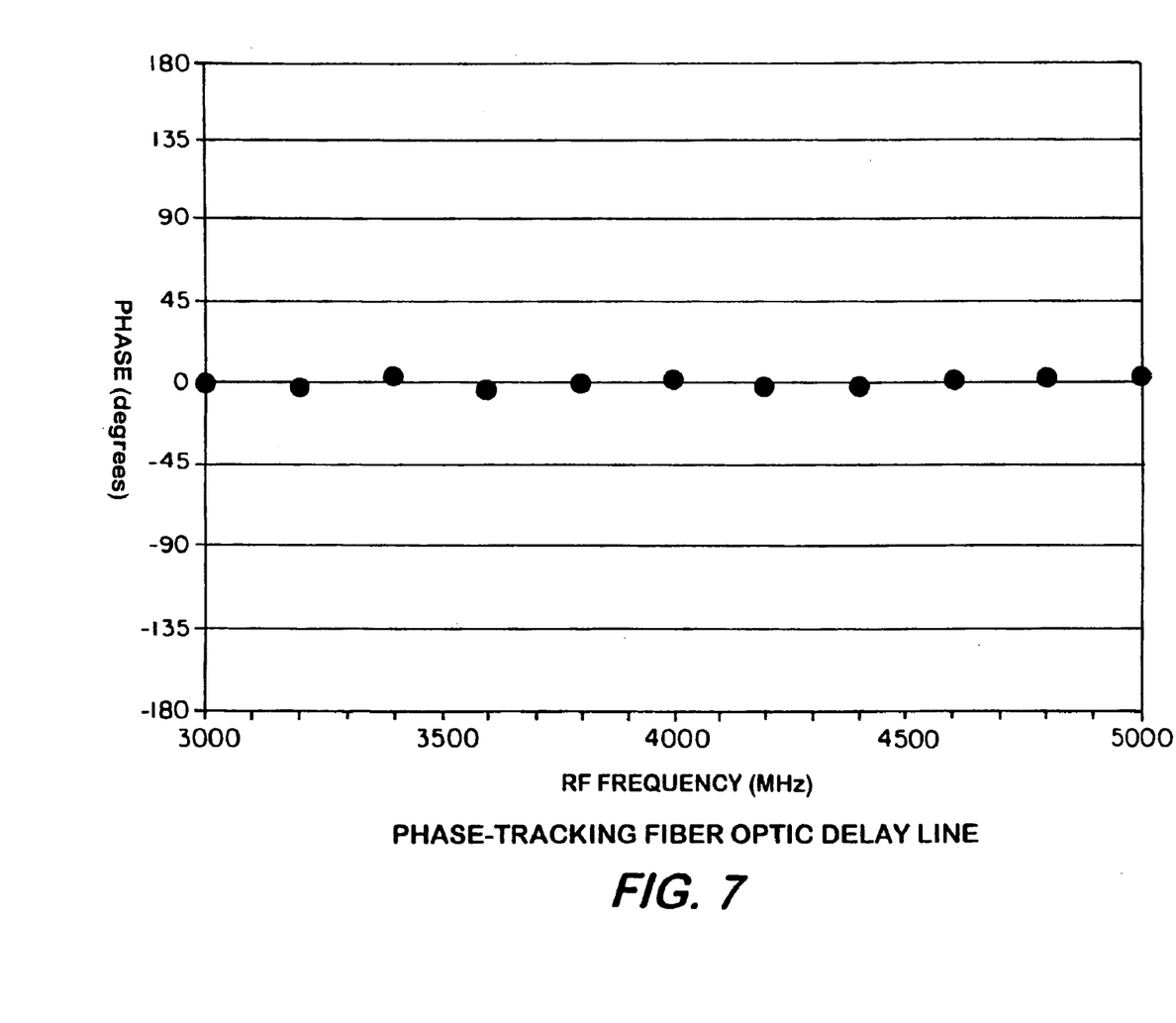
FIG. 7 shows a graph of the phase tracking performance of an embodiment of a phase tracking multichannel link (PMTL) according to the invention.

A system as shown in FIG. 1 was fabricated and tested, except that in lieu of an antenna array 12b, a synthesizer created a continuous wave (CW) RF waveform in the 3–5 Gigahertz microwave band to emulate a received plane waveform. A 3 dB Wilkinson-type RF splitter created 2 parallel signals, identical in amplitude and phase, that were input to separate RF channels. The phase difference between the 2 corresponding output signals, varied over the frequency range, measured phase matching (the offset) and phase tracking (the variation). In two consecutive measurements, the two split identical input signals were input to one pair and then to a different pair of the three direct current modulated laser transmitters (Ortel model 3741-C01-020) transmitting at wavelengths of 1546.12 nm, 1548.51 nm, and 1550.12 nn. It should be noted that a WDM may include fiber spooled within the WDM case that is unequal in length for the different channels of the WDM. It may then be desirable to modify the lengths of fiber pigtails or cables to maintain phase matching. Although this corrective measure might be expected to have deteriorated the measured PTML performance, in practice, it has been found not to have a significant effect. In production, WDM's used in PTML preferably should have short, phase matched fiber pigtails. The pigtails connected the transmitter output ports with a WDM-m, model DWDW23M3NVR01 made by E-Tek Dynamics. All pigtail connections were made by FCIAPC connectors. The WDM-m was connected to a WDM-d, model DWDM23D3NVR02 made by E-Tek Dynamics, through a Delay Spool made by Ortel, Model 355A-C11-10030. The spool was wound using a non-zero dispersion shifted optical fiber, type SMF-LS manufactured by Corning, 612 m in length, producing a 3 μs (±1%)-delayed multiplexed signal. The multiplexed signal was demultiplexed according to wavelength. The three demultiplexed signals at wavelengths of 1546.12 nm, 1548.51 nm, and 1550.12 nm were input separately to three different Ortel model 4512A-020 photodiode receivers. FIGS. 4–6 show some conventional measurements of link performance. For the phase tracking measurement, the RF outputs of each photodiode receiver drove a separate RF mixer driven by a common LO signal, downconverting the signal to 200 MHz for observation on an oscilloscope. The phase-tracking results are shown in FIG. 7.

FIG. 4 is a graph of the linear response of the 3 links demonstrated in the PTML, showing good linearity over a dynamic range approaching 50 dB, measured with approximately I MHz bandwidth.

FIG. 5 is a graph showing the successful amplitude tracking of the tested system. The three measured output frequency responses are within about 0.9 dB of each other across the frequency band. Use of wider frequency band components should improve amplitude tracking in future PTML systems.

FIG. 6 is a graph of signal transit time measured on a network analyzer, where it can be seen that there is minimal reflected signal. The triple transit signal is the undesired reflection of the original signal from the output to the input and back, hence transiting the system three times. It would appear at 9 microseconds of delay for this 3 microsecond delay line, but is buried in noise at less than the specified maximum of −75 dB relative to the original signal, attesting to the low reflection of the FC/APC fiber connectors.

FIG. 7 is a graph showing excellent phase tracking obtained by the invention as demonstrated in the tested system, with all its components assembled in essentially its final form. The graph shows phase tracking to within seven degrees peak-to-peak, the deviation of phase between channel 2 and channel 1 across the frequency band.

Obviously many modifications and variations of the present invention are possible in the light of the above teachings. It is therefore to be understood that the scope of the invention should be determined by referring to the following appended claims.

What is claimed is:

1. A phase tracking multichannel apparatus, comprising:
    a plurality of RF channels wherein each of said RF channels has a phase separation relative to each adjacent RF channel, and an output coupled to each of said RF channels for applying an RF output signal;
    a plurality of fixed output light sources, each of said fixed output light sources having an output for applying an optical carrier;
    a plurality of modulators, wherein each said modulator includes a first input for receiving a corresponding optical carrier, a second input for receiving a corresponding RF output signal, a third input for receiving a bias control signal, and an output for applying an RF modulated optical output signal;
    a plurality of fiber couplers, each said fiber coupler including an input for receiving one of said RF modulated optical output signals, a first output for applying an initial fiber coupler output signal, and a second output for applying a bias-adjusted optical modulator output signal;
    a plurality of monitor photodetectors, each said monitor photodetector including an input for receiving a corresponding fiber coupler output signal and an output for applying a monitor photodetector output control signal;
    a plurality of bias control circuits, each said bias control circuit including an input for receiving a corresponding monitor photodetector output control signal and an output for applying a bias control signal at said third input of a corresponding optical modulator and thereby bias-adjust each said fiber coupler second output;
    a multiplexer having an input for receiving each of said modulator output signals and an output for applying a multiplexed optical output signal having multiple RF modulation components with substantially the same phase separation as between corresponding said RF output signals;
    a common optical link having an input for receiving the multiplexed optical output signal and an output for applying the multiplexed optical output signal, said common optical link substantially maintaining the phase separation between RF modulation components on the multiplexed optical signal at said common optical link output as received at said common optical link input; and
    an optical signal receiving system having an input for receiving the multiplexed optical output signal.

2. An apparatus as in claim 1, further comprising an antenna array for feeding each of a plurality of RF signals into a corresponding channel of said plurality of RF channels.

3. An apparatus as in claim 1, wherein the fixed output light sources are laser diodes.

4. An apparatus as in claim 1, wherein said optical signal receiving system comprises:
- a demultiplexer having an input for receiving the multiplexed optical output signal and a plurality of outputs for applying each of a plurality of demultiplexed modulated optical signals having substantially the same phase separation between adjacent frequencies as said RF output signals;
- a plurality of photodetectors, each said photodetector having an input for receiving a demultiplexed modulated optical signal from a corresponding demultiplexer output and an output for applying an RF signal output representative of said photodetector input; and
- a user electronics for receiving and processing said photodetector RF signal outputs.

5. An apparatus as in claim 4, wherein the photodetectors are photodiodes.

6. An apparatus as in claim 1, wherein said apparatus comprises phase-matched components for phase tracking of RF signals within said apparatus.

7. An apparatus as in claim 1, wherein the user electronics includes a coherent receiver.

8. An apparatus as in claim 1, wherein the apparatus is an RF direction finder.

9. An apparatus as in claim 1, wherein the multiplexer is a wave division multiplexer.

10. An apparatus as in claim 1, wherein the common optical link comprises single mode, non-zero dispersion shifted optical fiber.

11. A phase tracking multichannel apparatus, comprising:
- a plurality of RF channels wherein each of said RF channels has a phase separation relative to each adjacent RF channel, and an output coupled to each of said RF channels for applying an RF output signal;
- a plurality of fixed output light sources, each of said fixed output light sources having an output for applying an optical carrier;
- a plurality of modulators, wherein each said modulator includes a first input for receiving a corresponding optical carrier, a second input for receiving a corresponding RF output signal, and an output for applying an RF modulated optical output signal;
- a multiplexer having an input for receiving each of said RF modulated optical output signals and an output for applying a multiplexed optical output signal having multiple RF modulation components with substantially the same phase separation as between corresponding said RF output signals;
- a common optical link having an input for receiving the multiplexed optical output signal and an output for applying the multiplexed optical output signal, said common optical link substantially maintaining the phase separation between RF modulation components at said common optical link output as received at said common optical link input; and
- an optical signal receiving system having an input for receiving the multiplexed optical output signal.

12. An apparatus as in claim 11, further comprising an antenna array for feeding each of a plurality of RF signals into a corresponding channel of said plurality of RF channels.

13. An apparatus as in claim 11, wherein the fixed output light sources are laser diodes.

14. An apparatus as in claim 11, wherein said optical signal receiving system comprises:
- a demultiplexer having an input for receiving the multiplexed optical output signal and a plurality of outputs for applying each of a plurality of modulated optical signals having substantially the same phase separation between adjacent frequencies as said RF output signals;
- a plurality of photodetectors, each said photodetector having an input for receiving a demultiplexed RF modulated optical signal from a corresponding demultiplexer output and an output for applying an RF signal output representative of said photodetector input; and
- a user electronics for receiving and processing said photodetector RF signal outputs.

15. An apparatus as in claim 14, wherein the photodetectors are photodiodes.

* * * * *